US009529846B2

(12) United States Patent
Wu et al.

(10) Patent No.: US 9,529,846 B2
(45) Date of Patent: Dec. 27, 2016

(54) DATA GRID ADVISOR

(75) Inventors: Juan Wu, Union City, CA (US); Mihnea Andre, Issy les Moulineaux (FR); Haiyan Du, San Ramon, CA (US); Ian Scott MacLeod, Feusines (FR)

(73) Assignee: SYBASE, INC., Dublin, CA (US)

( * ) Notice: Subject to any disclaimer, the term of this patent is extended or adjusted under 35 U.S.C. 154(b) by 919 days.

(21) Appl. No.: 12/970,039

(22) Filed: Dec. 16, 2010

(65) Prior Publication Data

US 2012/0158723 A1 Jun. 21, 2012

(51) Int. Cl.
*G06F 17/30* (2006.01)

(52) U.S. Cl.
CPC ... *G06F 17/30445* (2013.01); *G06F 17/30545* (2013.01)

(58) Field of Classification Search
CPC .................... G06F 17/30445; G06F 17/30545
See application file for complete search history.

(56) References Cited

U.S. PATENT DOCUMENTS

2010/0250563 A1* 9/2010 Cao et al. .................... 707/756
2012/0124100 A1* 5/2012 Schabenberger et al. .... 707/802

OTHER PUBLICATIONS

Article entitled "SAP's Sybase adds scalability to IQ analytic database", by Kanaracus, dated Jul. 7, 2011.*
Article entitled "Sybase Redefines Massively Parallel Processing (MPP) with Increased Analytic Performance, Scalaibility and Architectural Flexibility", by SAP, dated Nov. 9, 2010.*
Article entitled Scaling out Query Performance with Sybase Iq PlexQ), with an effective date of Nov. 9, 2010.*
Article entitled "Choosing a DBMS for Data Warehousing", Copyright 2002, by McKnight.*
Article entitled "Column-Stores vs. Row-Stores: How Different Are They Really?", by Abadi et al.. dated Jun. 12, 2008.*
Article entitled "A Deeper Look at Sybase: Sybase IQ", by Verschoor, dated May 13, 2011.*

* cited by examiner

*Primary Examiner* — Mahesh Dwivedi
(74) *Attorney, Agent, or Firm* — Stene, Kessler, Goldstein & Fox P.L.L.C.

(57) ABSTRACT

A system and method to generate an improved layout of a data grid in a database environment is provided. The data grid is a clustered in-memory database cache comprising one or more data fabrics, where each data fabric includes multiple in-memory database cache nodes. A data grid advisor capability can be used by application developers and database administrators to evaluate and design the data grid layout so as to optimize performance based on resource constraints and the needs of particular database applications.

21 Claims, 8 Drawing Sheets

700

100

600

| Node Slice | N1 | N2 | N3 | N4 | N5 | N6 |
|---|---|---|---|---|---|---|
| S1 | RW | RO | RO | | | |
| S2 | RO | RW | RO | | | |
| S3 | RO | RO | RW | | | |
| S4 | RW | RO | RO | | | |
| S5 | RO | RW | RO | | | |
| S6 | RO | RO | RW | | | |
| S7 | | | | RW | RO | RO |
| S8 | | | | RO | RW | RO |
| S9 | | | | RO | RO | RW |
| S10 | | | | RW | RO | RO |
| S11 | | | | RO | RW | RO |
| S12 | | | | RO | RO | RW |

FIG. 6

DATA GRID ADVISOR

BACKGROUND

Field

The present invention relates generally to databases, particularly to improving database performance and scalability.

Background

High-performance enterprise applications often encounter performance bottlenecks and scalability problems when trying to access data stored in a database. Traditionally, databases have used disk-based storage devices to store data. However, disk access can be very slow. To improve database performance, main memory has been used as a data buffer or cache for data stored on disk. To further improve performance and resolve scalability issues, particularly for large enterprise applications, traditional databases have employed distributed caching systems, which combine the scalability of distributed systems with the reduced access latency of main memory.

However, existing distributed caching systems pose significant challenges for database application developers and database administrators. For example, application developers and database administrators must determine how best to design and organize a distributed caching system in order to avoid database efficiency and performance problems. This involves a detailed understanding of not only which data should be cached, but also how and when such data is accessed. As information related to the enterprise database environment is often unavailable or difficult to acquire, it may be extremely difficult for application developers and database administrators to gain such an understanding.

BRIEF SUMMARY

The capability to generate a layout of applications and data within a data grid in a database environment is provided. The data grid is a distributed in-memory database cache with one or more data fabrics, each data fabric comprising a plurality of in-memory database cache nodes. Such a capability may be used by application developers and database administrators to evaluate and design the data grid layout so as to optimize performance based on resource constraints, including, for example, hardware resource limits and types of data granularity, and the needs of particular database applications.

Embodiments relate to producing an improved layout of a data grid in a database environment. In one embodiment, a workload is captured by a computing device from a first database server and at least one client of the first database server. The workload comprises a set of queries and responses between the first database server and the client(s). Dependency and volume information for the captured workload are produced based on the set of queries and responses in the captured workload. A layout of one or more data fabrics within the data grid in the database environment is generated based on resource constraints associated with the data grid and the dependency and volume information associated with the captured workload. Each data fabric comprises a plurality of cache nodes. Each cache node is an in-memory database server. The generated layout is then stored at the computing device.

In another embodiment, a system to produce an improved data grid layout in a database environment comprises a workload preparer and a core advisor. The workload preparer is configured to capture a workload from a first database server and at least one client of the first database server. The workload comprises a set of queries and responses between the first database server and the client. The workload preparer is also configured to produce dependency and volume information for the captured workload based on the set of queries and responses in the captured workload. The core advisor generates a layout of one or more data fabrics within a data grid in the database environment based on resource constraints associated with the data grid and the dependency and volume information associated with the captured workload. Each data fabric in the data grid comprises a plurality of cache nodes, and each cache node is an in-memory database server. The core advisor then stores the generated layout at a memory device.

Embodiments may be implemented using hardware, firmware, software, or a combination thereof and may be implemented in one or more computer systems or other processing systems.

Further embodiments, features, and advantages of the present invention, as well as the structure and operation of the various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the information contained herein.

BRIEF DESCRIPTION OF THE DRAWINGS/FIGURES

Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number.

FIG. 6 is a table illustrating an example of distributing ownership rights for multiple nodes based on round-robin slice teams, according to an embodiment.

Figure 1:
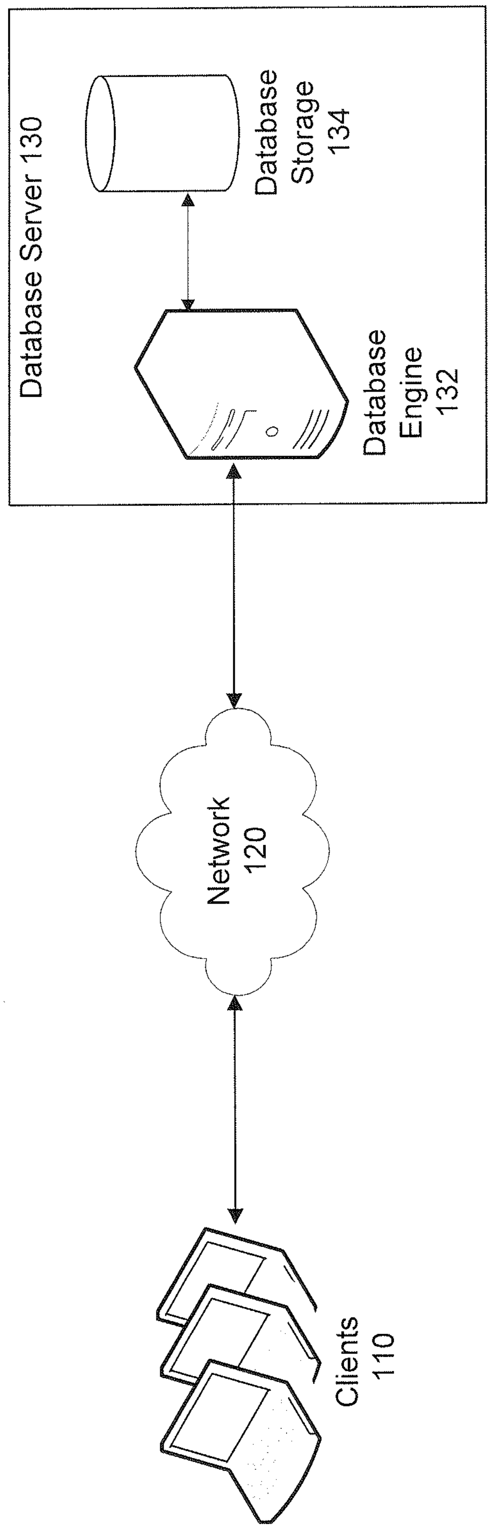
FIG. 1 is a diagram of an exemplary database system in which embodiments may be implemented.

The accompanying drawings, which are incorporated herein and form part of the specification, illustrate the embodiments of present invention and, together with the description, further serve to explain the principles of the invention and to enable a person skilled in the relevant art(s) to make and use the invention.

DETAILED DESCRIPTION

Table of Contents

I. Database System
II. Data Grid
III. Data Grid Advisor
A. Workload Capture
B. Workload Preparation/Transformation
C. Example Document Type Definition (DTD)
D. Workload Replay
E. Core Advisor
1. Database Granularity Data Fabric
2. Table Granularity Data Fabric
3. Partition Granularity Data Fabric
4. Cost-Benefit Analysis
IV. Method
V. Example Computer System Implementation
VI. Conclusion Embodiments relate to producing an improved or even an optimal layout of one or more data fabrics within a data grid in a database environment. As will be described in further detail below, the data grid is an ideal way to improve performance when processing critical transactions between a database server and one or more client applications.

While the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one skilled in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The term "in-memory database," or "IMDB," is used herein to refer broadly and inclusively to any database management system that primarily relies on main memory, rather than a disk-based mechanism, to store and manage data. In addition, such IMDBs typically reside entirely within main memory. A person skilled in the relevant art given this description would appreciate that IMDBs are generally faster than databases that rely on disks for storage.

I. DATABASE SYSTEM

Databases commonly organize data in the form of tables, each table having a number of rows and columns. Each table generally has a number of rows and columns, and each row in a table generally has a data value associated with each of the columns. This intersection of rows and columns is commonly referred to as a cell. A system needing access to data in the database typically issues a request in the form of a query. A query usually involves a request for the data contained in one or more cells of any rows which meet a particular condition. This condition often involves the comparison of the values of cells in a column to some other value to determine whether the row associated with the compared cell meets the condition.

FIG. 1 is a diagram of an exemplary database system 100 in which embodiments may be implemented. Database system 100 includes one or more clients 110, a network 120, and a database server 130. The database server 130 includes a database engine 132 and database storage 134.

Clients 110 are operable to send requests for data, commonly in the form of database queries, to database server 130 over network 120. Database server 130 replies to each request by sending a set of results, commonly in the form of result rows from a database table, to clients 110 over network 120. One skilled in the relevant art given this description will appreciate that any data format operable to convey a request for data and a reply to the request may be used. In accordance with an embodiment, the requests and replies are consistent with the conventions used in the Structured Query Language ("SQL"), although this example is provided solely for purposes of illustration and not limitation.

Clients 110 can each be any type of computing device having one or more processors and a communications infrastructure capable of receiving and transmitting data over a network. An embodiment of clients 110 may also include a user input such as, for example, a mouse, QWERTY keyboard, touch-screen, microphone, or a T9 keyboard. For example, clients 110 can include, but is not limited to, a mobile phone, a personal digital assistant (PDA), a computer, a cluster of computers, a set-top box, or other similar type of device capable of processing instructions and receiving and transmitting data to and from humans and other computing devices.

Similarly, database server 130 may be implemented on any type of computing device. Such a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment, including but not limited to, a cluster of servers.

Network 120 can be any network or combination of networks that can carry data communication. Such network can include, but is not limited to, a wired (e.g., Ethernet) or a wireless (e.g., Wi-Fi and 3G) network. In addition, network 120 can include, but is not limited to, a local area network, medium area network, and/or wide area network such as the Internet. Network 120 can support protocols and technology including, but not limited to, Internet or World Wide Web protocols and/or services. Intermediate network routers, gateways, or servers may be provided between components of database system 100 depending upon a particular application or environment.

When a request for data, such as a query, is received by database server 130, it is handled by database engine 132, in accordance with an embodiment of the present invention. Database engine 132 is operable to determine the data requested by the query, obtain the data, and provide a reply to the query. One skilled in the relevant art given this description will appreciate that while database engine 132 is illustrated as a single module in database system 100, database engine 132 may be implemented in a number of ways in order to accomplish the same function, including separating each of the aforementioned operations performed by database engine 132 into individual modules. Accordingly, the illustration of modules in database server 130 is not a limitation on the implementation of database server 130.

Database engine 132 is operable to obtain the data in response to the query from database storage 134, in accordance with an embodiment of the present invention. Database storage 134 can store files or records of a database in a data structure. In accordance with an embodiment of the present invention, database records can be stored in a table data structure, the table having data rows and columns. At the intersection of each row and column is a data cell, the data cell having access to a data value corresponding to the associated row and column. Each column, in accordance with an embodiment of the present invention, has an associated data type, such as "string" or "integer," which is used by database engine 132 and clients 110 to interpret data contained in a data cell corresponding to the column. In accordance with an embodiment of the present invention, the database comprises multiple tables.

Additionally, database storage 134 comprises alternate means of indexing data stored in a table of a database, in accordance with an embodiment of the present invention. Database engine 132 is operable to analyze a query to determine whether an available alternate means is useful to better access the data stored in a table, then utilizes this alternate means to obtain data from the table, in accordance with an embodiment of the present invention.

Further, database storage 134 may be implemented as a relational database and database engine 132 may be implemented using a Relational Database Management System (RDBMS), in accordance with an embodiment of the present invention. An example of such a RDBMS is, for example and without limitation, Adaptive Server Enterprise (ASE) from Sybase, Inc. of Dublin, Calif. A person skilled in the relevant art given this description would appreciate that embodiments may be operable to work with any RDBMS.

II. DATA GRID

Figure 2:
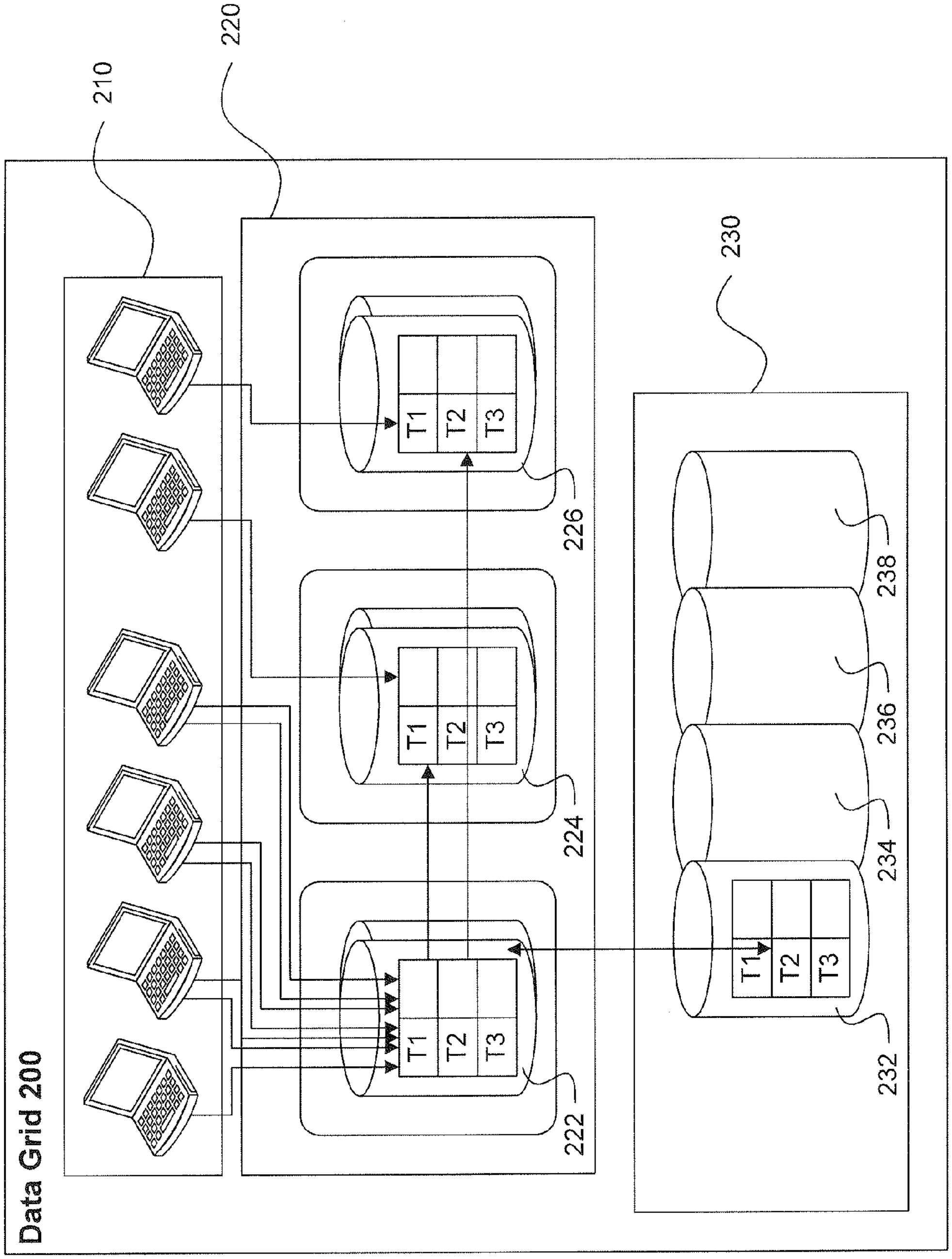
FIG. 2 is an architecture diagram of an exemplary data grid in a database environment, according to an embodiment.

FIG. 2 is an architecture diagram of an exemplary data grid 200 in a database environment, according to an embodiment. Data grid 200 includes grid applications 210, a data fabric 220, and a grid backend 230, according to an embodiment. Although only data fabric 220 is shown, data grid 200 can have multiple data fabrics similar to data fabric 220, as described herein. Data fabric 220 includes a cache node 222, a cache node 224, and a cache node 226, according to an embodiment. Similarly, although only cache nodes 222, 224, and 226 are shown, more or fewer cache nodes may be used as necessary. Grid backend 230 includes a backend database 232, a backend database 234, a backend database 236, and a backend database 238, according to an embodiment.

A person skilled in the relevant art given this description would appreciate that grid backend 230 may include more or fewer databases than backend databases 232, 234, 236, and 238, as illustrated in FIG. 2. A person skilled in the relevant art given this description would also appreciate that although not shown in FIG. 2, data grid 200 and its subcomponents, including grid applications 210, a data fabric 220, and a grid backend 230, may include one or more additional components as may be necessary.

For ease of explanation, data grid 200 will be described in the context of database system 100 of FIG. 1, but is not intended to be limited thereto. In an embodiment, the various components of data grid 200, including grid applications 210, data fabric 220, and grid backend 230, are communicatively coupled to each other via, for example, a network (e.g., network 120 of FIG. 1).

In an embodiment, data grid 200 comprises an architecture built around a distributed in-memory database (IMDB) cache that is clustered on multiple physical machines. Such a clustered IMDB cache provides a responsive transaction-performance model for processing query transactions to and from client applications (e.g., executed by clients 110 of FIG. 1) and a database server (e.g., database server 130 of FIG. 1). As will be described in further detail below, the clustered IMDB cache of data grid 200 allows for scale-out on multiple database servers. It should be noted that data grid 200 is not simply a mid-tier cache between client applications 210 and grid backend 230. Thus, in contrast to conventional caching systems, data grid 200 can continue to seamlessly process transactions even in the absence of grid backend 230, as described in further detail below.

In an embodiment, grid backend 230 is a relational database and relational database management system (RDBMS). As noted above, an example of such a RDBMS is, for example and without limitation, Adaptive Server Enterprise (ASE) from Sybase, Inc. of Dublin, Calif. Grid backend 230 may be implemented using, for example, database server 130 of FIG. 1. In an embodiment, backend databases 232, 234, 236, and 238 are disk-based storage devices configured to store persistent backend data. For example, such backend data may comprise persistent database files or records commonly organized in the form of tables, as described above.

As noted above, data grid 200 may contain one or several data fabrics. In an embodiment, each data fabric (e.g., data fabric 220) within data grid 200 is a clustered memory cache comprising multiple cache nodes (e.g., cache nodes 222, 224, and 226), which are configured to store all or portions of data in a database system. In an embodiment, cache nodes 222, 224, and 226 of data fabric 220 are IMDBs implemented using one or more database servers such as, for example, database server 130, described above. Such database servers can be implemented using any computing device having at least one processor and at least one memory device for executing and storing instructions. Such a memory device may be any type of recording medium coupled to an integrated circuit that controls access to the recording medium. The recording medium can be, for example and without limitation, a semiconductor memory such as random-access memory (RAM), high-speed non-volatile memory, or other similar type of memory or storage device. Further, cache nodes 222, 224, and 226 of data fabric 220 may be communicatively coupled to each other and one or more other devices within the database system via, for example, a high-speed network or communications interface.

In an embodiment, grid applications 210 may be any type of client application that connects to any of the cache nodes of data fabric 220 for purposes of optimizing transaction performance and/or scale-out. For example, grid applications 210 may be one or more time-sensitive enterprise client applications that require reduced access latency and fast query response times. Grid applications 210 may be hosted, for example, on one or more computing devices, for example, clients 110 of FIG. 1. In an embodiment, grid applications 210 send transaction queries to data grid 200 over a network, for example, network 120 of FIG. 1. Grid applications 210 can be implemented in software, firmware, hardware, or a combination thereof. Further, grid applications 210 can also be implemented as computer-readable code executed on one or more computing devices capable of carrying out the functionality described herein. As noted above, examples of computing devices include, but are not limited to, clients 110 of FIG. 1.

In an embodiment, cache nodes 222, 224, and 226 contain backend data cached from grid backend 230 at startup. As will be described in further detail below, all or a portion of the backend data stored in grid backend 230 may be copied initially to data fabric 220 at startup. In another embodiment, data fabric 220 can be started up without copying backend data from grid backend 230. For example, the data loaded into the cache nodes of data fabric 220 (including cache nodes 222, 224, and/or 226) may be from grid applications 210. Thus, grid applications 210 may connect to cache nodes 222, 224, and 226 to store and manage data directly therein. Such application data may be coherent or consistent across cache nodes 222, 224, and 226 without having any corresponding backend data or data local to a particular cache node within data fabric 220. A person skilled in the relevant art would appreciate that data grid 200 may employ one or more data services that facilitate transaction processing between grid applications 210 and data grid 200, including data fabric 220 and its components (cache nodes 222, 224, and 226).

Although shown as a component of data grid 200 in FIG. 2, it should be noted that grid backend 230 can be an optional component for data grid 200, according to an embodiment. Thus, the processing of data within data grid 200 (and data fabric 220) need not depend on the presence of grid backend 230. Accordingly, grid backend 230 can be connected and disconnected to and from data grid 200 as may be necessary for given application. For example, cache nodes 222, 224, and 226 may be implemented using volatile memory and data fabric 220 may be configured to start without any initial backend data or store only temporary or transient data that does not need to be stored for later use. Further, if cached data stored at data fabric 220 needs to be persisted at shutdown, data fabric 220 may be configured to automatically save its contents to another persistent or non-persistent storage location. Such storage location may be, for example, a disk-based storage device or another backend database communicatively coupled to data grid 200 in the database system.

Alternatively, if data fabric 220 holds only transient data, it may be simply shut down without requiring the presence of a backend. It would be apparent to a person skilled in the relevant art given this description that such transient data is commonly used in high performance computing (HPC) type applications. It would also be apparent to a person skilled in the relevant art given this description that grid application 210 can include such HPC-type applications, but are not limited thereto.

It would be apparent to a person skilled in the relevant art given this description that the use of data grid 200, as described herein, within an enterprise database system could provide significant performance gains for processing transactions within the database system. Thus, one feature of embodiments of the present invention is to support new types of grid applications (e.g., grid applications 210), which can fully leverage such performance gains. However, another feature is to rework existing applications based on their operating characteristics in order to utilize the functionality of such a data grid within a database environment. As will be described in further detail below, a data grid advisor can be used by application developers and database administrators to provide these features, in accordance with embodiments.

III. DATA GRID ADVISOR

Figure 3:
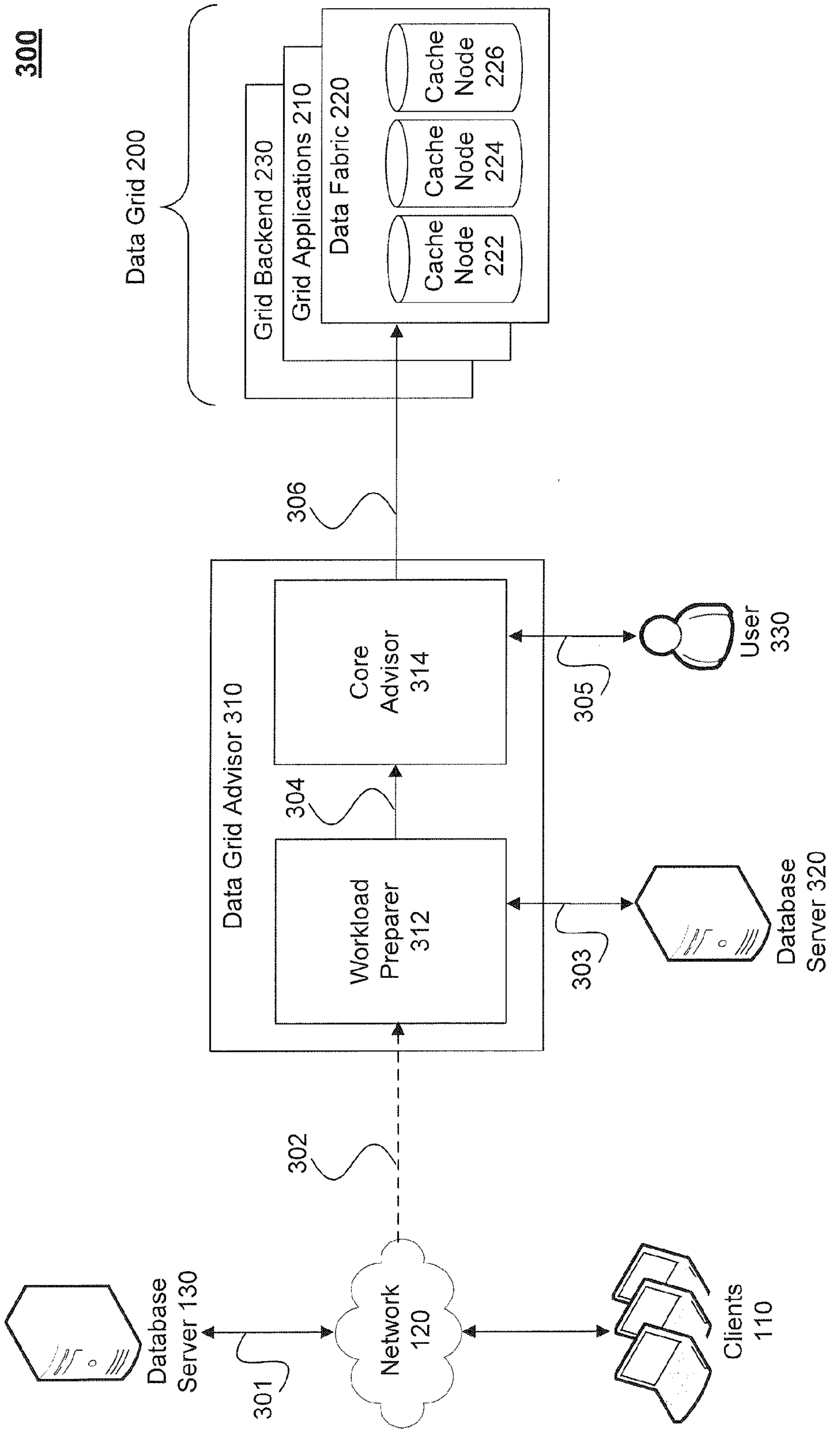
FIG. 3 is a diagram illustrating an exemplary database system in which a data grid advisor may be implemented, according to an embodiment.

FIG. 3 is a diagram illustrating an exemplary database system 300 in which a data grid advisor 310 may be implemented, according to an embodiment. Database system 300 includes a data grid advisor 310, a database server 320, and a user 330, according to an embodiment. Data grid advisor 310 includes a workload preparer 312 and a core advisor 314, according to an embodiment. For ease of explanation, database system 300 will be described in the context of database system 100 of FIG. 1 and data grid 200 of FIG. 2, but is not limited thereto.

A. Workload Capture

As described above, clients 110 send requests for data, commonly in the form of a database query, to database server 130 over network 120. As illustrated in FIG. 3, transactions 301 represent the series of queries from clients 110 to database server 130 in addition to the corresponding responses from database server 130 to clients 110. Database server 130 can be a production database server, in accordance with embodiments. In contrast, database server 320 can be designated as a support or test database server, as will be described in further detail below. However, it is noted that database server 320 can also be a production database server. It is further noted that a test database server need not be used within database system 300. For example, an embodiment of workload preparer 212 may be implemented in a production database server (e.g., database server 130). Moreover, such an embodiment may be implemented in the production database server so as to not impact the performance of the production database server. Thus, the description of database server 320 as a test database server is provided for illustrative purposes only, and embodiments are not limited thereto.

In an embodiment, workload preparer 312 is communicatively coupled to database server 130 via a public or private network, for example, network 120. In an embodiment, workload preparer 312 is also communicatively coupled to database server 320 via a public or private network. However, a person skilled in the relevant art would appreciate that workload preparer 312 may be communicatively coupled to database server 130 and database server 320 in any of several different ways.

Further, although workload preparer 312 is shown with respect to data grid advisor 310 in FIG. 3, it should be noted that embodiments of workload preparer 312, or portions thereof, can be implemented within database server 130. For example, workload preparer 312 may be implemented to operate as a component of database server 130 while core advisor 314 may be implemented to run on a computing device separate from database server 130. Such computing device can include, but is not limited to, a computer, workstation, embedded system, networked device, mobile device, or other type of processor or computer system capable of carrying out the functionality described herein.

In an embodiment, workload preparer 312 is operable to capture a workload 302 based on transactions 301 between clients 110 and database server 130. For example, workload preparer 312 may capture all of the requests and responses between database server 130 and clients 110 over network 120. Captured workload 302 includes, but is not limited to, a set of queries and associated parameters from client 110 together with the corresponding set of responses from database server 130. Captured workload 302 can also include, but is not limited to, detailed timing information for the set of queries, associated parameters, and responses. It should be noted that although only database server 130 is shown, workload preparer 312 can be configured to capture multiple workloads corresponding to multiple database servers, according to an embodiment.

It would be apparent to a person skilled in the art that workload preparer 312 can use any one of various well-known application layer and network protocols and standards including, but not limited to, Tabular Data Stream (TDS) and Transmission Control and Internet Protocols (TCP/IP), to facilitate the capture of workload 302. Further, workload preparer 312 can use any one of various well-known methods to capture workload 302. In an example, workload preparer 312 may employ a server-based capture facility to capture network packets to and from database server 130. Such a facility may be implemented using for example, the libpcap library for Unix-based systems and/or WinPcap for systems based on the Microsoft Windows Operating System. In another example, workload preparer 312 may use tcpdump, a commonly-used network packet analyzer, to intercept and generate captured workload 302. Accordingly, captured workload 302 may be stored as one or more files (e.g., pcap files) located at database server 130, which can be accessed and processed by workload preparer 312.

Workload preparer 312 utilizes multiple capture mechanisms to help achieve an acceptable tradeoff between minimizing additional overhead for database server 130 and minimizing the probability of data loss, in accordance with embodiments. For example, workload preparer 312 may be configured with various configuration options. Such configuration options may include, but are not limited to, a workload capture size limit, a workload capture time limit, and a workload capture overhead limit. Workload capture overhead may be, for example, any subset of total query time spent by workload preparer 312 performing workload capture, ignoring time between queries.

In an embodiment, workload preparer 312 may be configured with such configuration options via a configuration file accessible by workload preparer 312 or through a user interface (e.g., a command-line interface or graphical user interface). For example, user 330 (e.g., a database administrator) may use such interface to specify a duration for capture and an upper limit for overhead measured as a percentage of the total overhead, which may be calculated as the total overhead for all queries during a period of capture.

B. Workload Preparation/Transformation

In an embodiment, workload preparer 312 is operable to transform the information in captured workload 302 to produce a raw workload. For example, captured workload 302 may comprise network packets in raw binary form. Thus, workload preparer 312 processes workload 302 to produce a raw workload comprising substantially the same information as in captured workload 302, but reformatted to a representation better suited for processing. Accordingly, workload preparer 312 may transform captured workload 302 into a series of textual-formatted data files, for example and without limitation, Extensible Markup Language (XML) files. The advantages to using XML files would be apparent to a person skilled in the relevant art given this description.

In a further embodiment, the raw workload produced by workload preparer 312 contains a data file (e.g., XML file) for each distinct connection from a client within clients 110 to database server 130 ("a per-connection file"). It would be apparent to a person skilled in the relevant art given this description that such connection may correspond to any type of network connection or protocol for transferring data between clients 110 and database server 130. For example, such connections may correspond to TDS connections between one or more clients in clients 110 and database server 130. The raw workload can also contain a master file that lists all of the per-connection files. Workload preparer 312 may produce additional files such as, for example, a report file that described the captured workload 302 and the connections found therein in a readable format, according to an embodiment.

C. Example Document Type Definition (DTD)

An example Document Type Definition (DTD) for a raw workload file produced by workload preparer 312 from a captured workload is provided below for illustrative purposes only. A person skilled in the relevant art given this description would appreciate that the following is only an example and that such raw workloads may be formatted using other types of document formats. The term "protocol data unit (PDU)" is used herein to refer broadly and inclusively to any unit of data or information that is specified in a network protocol layer including, but not limited to, control information, address information, or any other data. Further, this example is provided in the context of the TDS protocol, but is not intended to be limited thereto.

```
<!ELEMENT connection (server client time-start loginrec? pdu*)>
<!ELEMENT server (#PCDATA)>
<!ELEMENT client (#PCDATA)>
<!ELEMENT loginrec (username, hostname, servname, hostproc,
appname, progname)>
<!ELEMENT username (#PCDATA)>
<!ELEMENT hostname (#PCDATA)>
<!ELEMENT servname (#PCDATA)>
<!ELEMENT hostproc (#PCDATA)>
<!ELEMENT appname (#PCDATA)>
<!ELEMENT progname (#PCDATA)>
<!ELEMENT pdu (time frame from msgtype status length channel?
packet? window? #PCDATA)>
<!ELEMENT time (#PCDATA)>
<!ELEMENT frame (#PCDATA)>
<!ELEMENT from (#PCDATA)>
<!ELEMENT msgtype (#PCDATA)>
<!ELEMENT status (#PCDATA)>
<!ELEMENT length (#PCDATA)>
<!ELEMENT channel (#PCDATA)>
<!ELEMENT packet (#PCDATA)>
<!ELEMENT window (#PCDATA)>
```

In this example, the <server> and <client> elements provide the server and client IP addresses and port numbers, using standard Internet notation (IPv4 or IPv6).

The <time-start> element provides the timestamp of the first protocol data unit (PDU) or zero in the absence of any PDUs.

The <loginrec> element contains the details extracted from the login record.

The <pdu> element represents a Protocol Data Unit (PDU), the atomic packet of the TDS protocol. There can be zero or more of these in a connection. The following elements are included in every PDU:

The <time> element represents an offset from the connection's<start-time>, in seconds with microsecond precision.

The <frame> element indicates the frame number where the PDU appeared in the original network capture file. This is to facilitate examination of the original capture file with network packet analysis tools. It is not used by the playback utility.

The <from> element indicates the origin of the PDU. It should be either client or server.

The <msgtype> element represents the MsgType byte of the Message Buffer Header as defined in the TDS protocol.

The <status> element represents the Status byte of the Message Buffer Header as defined in the TDS protocol.

The <length> element represents the Length field of the Message Buffer Header as defined in the TDS protocol.

The optional <channel> element represents the Channel field of the Message

Buffer Header as defined in the TDS protocol.

The optional <packet> element represents the Packet byte of the Message Buffer Header as defined in the TDS protocol. A value of 0 can be assumed if this element is not present in a PDU.

The optional <window> element represents the Window byte of the Message Buffer Header as defined in the TDS protocol. A value of 0 is assumed if this element is not present in a PDU.

The #PCDATA that follows represents Length-8 bytes (where Length is the value of the <length> element) that comprise the PDU. The data may either be in hexadecimal ASCII representation, e.g. 0x00010203 . . . or in quoted ASCII, e.g. "abcdef". XML entities will be used to represent less-than, ampersand, and other characters that should not be present in PCDATA.

D. Workload Replay

Like database server 130, database server 320 can be any database server capable of communicating with one or more clients (e.g., clients 110) to process queries, in accordance with embodiments. Also like database 130, database server 320 can be adapted to execute a RDBMS, such as ASE by Sybase, Inc. of Dublin, Calif. However, as noted above, database server 320 is a test or support database server (as opposed to a production database server) within database system 300. In an embodiment, database server 320 is a replicated version of database server 130 that is not used in production, i.e., does not serve data to clients, such as clients 110.

In an embodiment, workload preparer 312 is configured to use database server 320 to perform a specialized replay of queries and responses in the raw workload generated from captured workload 302. The result of such a replay is referred to herein as a cooked workload, which comprises dependency and cost information corresponding to the set of queries and responses in captured workload 302. As illustrated in FIG. 3, a cooked workload 304 generated by workload preparer 312 will be sent to core advisor 314. As will be described in further detail below, core advisor 314 will use the dependency and cost information in cooked workload 304 to generate an improved layout for a data grid (e.g., data grid 200).

In an embodiment, workload preparer 312 is configured to produce the dependency and volume information using a synthetic workload. In this embodiment, workload preparer 312 is operable to replay queries and responses contained in a synthetic workload without the benefit of a raw workload generated from captured workload 302. In an embodiment, such a synthetic workload may be generated by workload preparer 312 by simulating queries and responses between database server 130 and clients 110 based on a database schema in addition to various configuration options via user input, as described above.

In a different embodiment, the synthetic workload is generated by a database design program or utility within database system 300 also based on the database schema and user input. Such database schema may be any conceptual, logical, or physical schema used to describe a database supported by a RDBMS within database system 300. A person skilled in the relevant art given this description would appreciate that any one of various types of database schemas may be used as necessary.

It should also be noted that a document-type definition (DTD) similar to the raw workload example, provided above, may be used for the cooked and/or synthetic workloads as well. It should also be noted that a full and accurate replay is not the primary goal of the specialized replay performed by workload preparer 312. Rather, the primary goal is to produce the cooked workload for core advisor 314. This leads to a "best effort" replay, where some divergence between originally captured workload 302 and the replayed cooked workload 304 is to be expected. This is especially true if the concurrency in the captured workload cannot be matched during the replay.

E. Core Advisor

In an embodiment, core advisor 314 is configured to generate a layout of data fabric 220 within data grid 200 in database system 300 based on resource constraints associated with data grid 200 and the generated dependency and volume information associated with the cooked workload 304. As noted above, cooked workload 304 comprises the dependency and volume information, which workload preparer 312 generates based on a specialized replay using a test or support database server, such as database server 320. Also, as noted above, the dependency and volume information may be associated with a synthetic workload, either generated by workload preparer 312 or another database program or utility, which generates the synthetic workload for use by core advisor 314.

Resource constraints associated with data grid 200, including data fabric 220, include, but are not limited to, one or more database schemas, as described above, hardware resource limits, and the type of database granularity. Hardware resource limits can be any type of hardware limitation associated with one or more data fabrics of data grid 200. Examples of such hardware resource limits include, but are not limited to, the total number of caches nodes within data fabric 220 and the memory size of each cache node. Such hardware resource limits may be input by user 330 via a command-line or graphical user interface (not shown) of data grid advisor 310. User 330 can include, for example, a database administrator or database application developer.

In an embodiment, user 330 may also specify database or table granularity objectives for data grid 200. In an embodiment, cache nodes 222, 224, and 226 of data fabric 220 are associated with two different types of databases: a fabric database (Fab-DB) or a node database (Node-DB). A Fab-DB is global to data fabric 220 and data consistency is automatically maintained across cache nodes 222, 224, and 226. It is redundantly stored for high-availability (HA) and scalability on several associated read-only (RO) nodes. In contrast, a Node-DB is local to a cache node and it may or may not be present at other cache nodes. No data consistency is maintained across the nodes for a Node-DB database. In an example, all system-specific databases are Node-DBs and all cached user databases are Fab-DBs. A person skilled in the relevant art would appreciate that these designations are provided for illustrative purposes and embodiments are not limited thereto. In a further embodiment, a Fab-DB can have either of three levels of granularity: database granularity, table granularity, or partition granularity.

1. Database Granularity Data Fabric

In an example, a database from grid backend 230 (e.g., backend database 232) may be entirely cached as a Fab-DB in data fabric 220 for database granularity. Identical replicas of the Fab-DB are cached on cache nodes 222, 224, and 226. One node is designated as the read-write (RW) owner where data may be both read and written. The other nodes would accordingly hold read-only (RO) copies of the database. Further, any data modifications can be asynchronously propagated from the RW owner to the RO nodes, in accordance with embodiments.

2. Table Granularity Data Fabric

In another example, one or more database tables from grid backend 230 (e.g., backend database 232) may be entirely cached as Fab-DB tables in data fabric 220 for table granularity. Identical replicas of the Fab-DB tables are cached on cache nodes 222, 224, and 226. One node is designated as the read-write (RW) owner where data may be both read and written. The other nodes would accordingly hold read-only (RO) copies of the tables. Further, similar to database granularity, any data modifications can be asynchronously propagated from the RW owner to the RO nodes, in accordance with embodiments.

3. Partition Granularity Data Fabric

In yet another example, portions of a backend database from grid backend 230 may be cached in data fabric 220 for a partition granularity. In an embodiment, the portions of the backend database can be distributed or sliced across cache nodes 222, 224, and 226 of data fabric 220. The slicing of the data from the backend database is done across the primary-foreign key inter-table relationship, so that any point query can be fully executed on any single cache node of data fabric 220. A set of tables that are connected by primary-foreign key constraints is referred to herein as a database tree schema (or simply "tree schema"). Each database tree schema has a root table and a set of child tables. A table is a child table if it has a foreign key referring to its parent. A tree schema can have several levels of child tables, making it a tree hierarchy.

Figure 4:
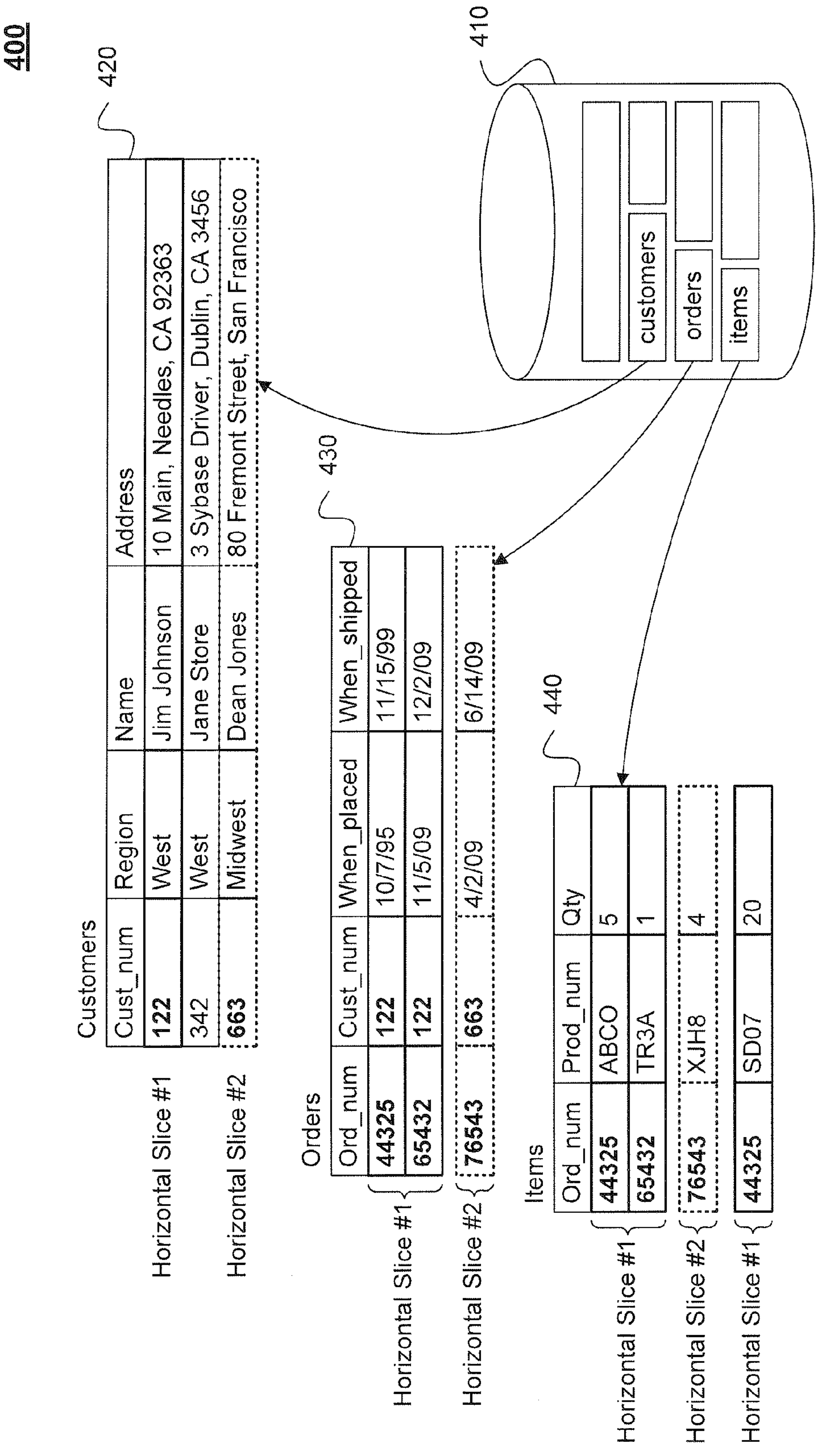
FIG. 4 illustrates an exemplary database tree schema, according to an embodiment.

FIG. 4 illustrates an exemplary database tree schema 400, according to an embodiment. The example tree schema 400 includes a backend database 410, which may be any backend database within grid backend 230 (e.g., backend database 232). Backend database 410 includes a customers table 420, an order table 430, and a items table 440. A person skilled in the relevant art given this description would appreciate that the database and tables are provided for illustrative purposes only and embodiments are not limited thereto.

In the example illustrated in FIG. 4, customers table 420 is the root table of this hierarchy. It has a primary key on cust_num, which is the customer number. Orders table 430 has multiple orders per customer and has a foreign key constraint on the cust_num column. At the same time, it has a primary key of ord_num. For example, each order within orders table 430 can have several items and hence items table 440 is connected to orders table 430 on the foreign key constraint ord_num, while having a primary key of its own on prod num. In this example, customers table 420, orders table 430, and items table 440 form tree schema 400 with customers table 420 at the root, orders table 430 a child of customers table 420 and items table 440 a child of orders table 430. When adopting such a tree schema into data grid 200, the child tables must include the primary key of the root table in its primary key, making it a composite key. For example, orders table 430 may need to have a primary key on (ord_num, cust_num).

Further, a subset of the backend database tables that form a tree schema can be sliced across a set of horizontal virtual partitions. Each such horizontal slice is stored on a cache node of data fabric 220. Such cache node (e.g., any one of cache nodes 222, 224, and 226) would have full and exclusive ownership of the data (both RW and RO). It should be noted that the corresponding backend data within backend database 410 may still be partitioned differently or unpartitioned. An advantage of the above-described data fabric layout offers excellent relational data scale-out to grid applications 210.

Figure 5:
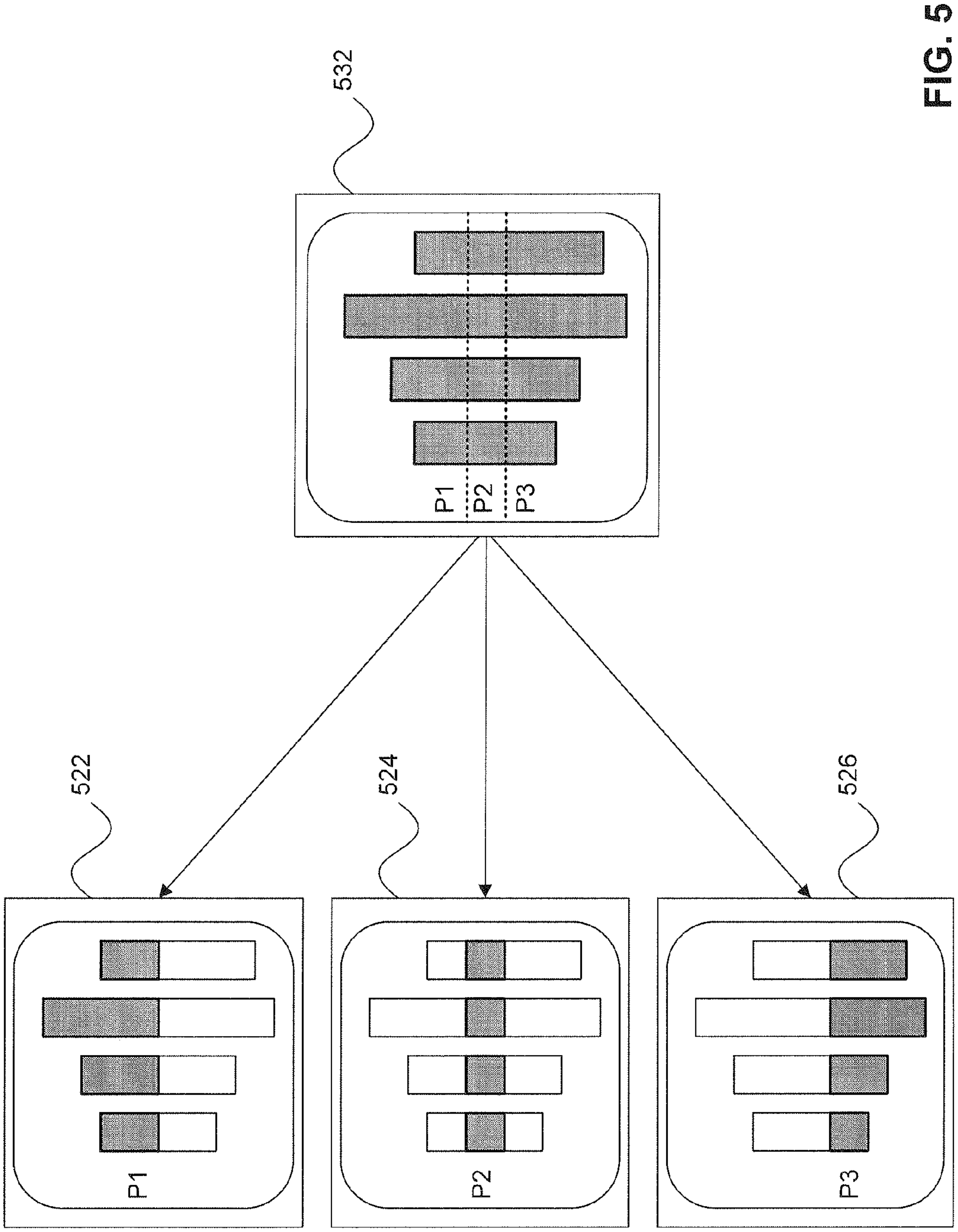
FIG. 5 is a diagram illustrating an example of splitting horizontal partitions from a set of tables across multiple nodes for a data fabric having partition granularity, according to an embodiment.

FIG. 5 is a diagram illustrating an example of splitting horizontal partitions (P1, P2, and P3) from a set of tables within backend database 532 across cache nodes 522, 524, and 526 within data fabric having partition granularity, according to an embodiment. Such data fabric may be implemented using, for example, data fabric 220 of FIG. 2 and cache nodes 522, 524, and 526 may be implemented using cache nodes 222, 224, and 226, described above. Backend database 532 may be implemented using, for example, backend database 232, described above. In the example illustrated in FIG. 5, four tables from backend database 532 belong to a tree schema (e.g., tree schema 400 of FIG. 4, described above) and are partitioned. It should be noted that each partition (P1, P2, and P3) may be stored on one or several cache nodes within the data fabric.

Referring back to FIG. 3, core advisor 314 provides an interface 305 that user 330 (e.g., an application developer and/or database administrator) can use to create a partitioned data fabric layout which best fits the needs of a particular grid application, according to an embodiment. For example, core advisor 314 can offer a high-level abstraction via, for example, a graphical user interface, that hides the low level partitioning details, as described above.

4. Cost-benefit Analysis

In an embodiment, core advisor 314 generates an improved layout of data fabric 220 by performing a cost-benefit analysis. For example, when deciding the number of cache nodes that can achieve best performance for cooked workload 304, user 330 may specify via an interface to core advisor 314 a range of cache nodes (e.g., Nmin to Nmax) for data grid layout generation. In an embodiment, core advisor 314 calculates the cost and benefits for available cache nodes by comparing them to see what number of cache nodes can achieve the best cost-benefit ratio. This cost-benefit information may be graphically presented to user 330, according to an embodiment.

However, it may not be possible for core advisor 314 to calculate the cost-benefits for all cache node within the user-specified node range if, for example, the range of cache nodes within data fabric 220 is large. Thus, core advisor 314 may be configurable by user 330 according to a time limit, within which core advisor 314 can apply a binary search algorithm to try to calculate out the cost-benefits for as many cache nodes within data fabric 220 as possible, in accordance with an embodiment. In an example, core advisor 314 may first calculate the cost-benefit for Nmin and Nmax followed by a cache node located between these, represented by the formula Nmin+(Nmax−Nmin)/2. Core advisor 314 can continue to fold the range in half and calculate the cost-benefit for each middle node between the lower and upper half of the node range within such user-defined time limit. In a further example, for a calculation algorithm that is not very computationally intensive and a relatively small range of nodes (e.g., less than 16), core advisor 314 may calculate cost-benefits for all nodes in the node range.

In an embodiment, core advisor 314 provides an analysis report to show the cost-benefit numbers achieved/improved at different node setting and give comparison to the grid layout's performance gain when using different node limit. A person skilled in the relevant art given this description would appreciate that such analysis report may be formatted in any of several well-known formats, which may or may not be specific to a particular database system. For example, core advisor 314 may output a status of the cost-benefit calculation for each cache node, including some timestamp information.

In a further embodiment, core advisor 314 may provide an estimation of throughputs for data grid 200 and make performance comparisons based on various data fabric layouts, where each configuration comprises a different number of nodes. For example, the cost models to calculate throughput for database granularity, partition granularity and table granularity are different. For database/table granularity, core advisor 314 may use cost, pain and gain for closures, application, connections to calculate throughputs for each node. For partition granularity, core advisor 314 may use estimated in-memory slice numbers to calculate throughputs for the entire grid.

For a data fabric layout based on partition granularity, multiple slices are put into slice teams and multiple cache nodes are put into node sets, according to an embodiment. Core advisor 314 can decide how to distribute the slice teams on such node sets. A person skilled in the relevant art given this description would appreciate that any number of well-known methods may be used to distribute slice teams on node sets. One example is to use a round-robin format for distributing RO and/or RW ownership of cache nodes based on multiple slice teams.

FIG. 6 is a table 600 illustrating an example of distributing ownership rights for multiple nodes based on round-robin slice teams, according to an embodiment. In the example shown in table 600, a data fabric layout with twelve slices on six cache nodes is used. Two slice teams and two sets of nodes are formed.

In an embodiment, core advisor 314 is further configured to identify a subset of queries from the set of queries in captured workload 302 based on the resource constraints associated with data grid 200 and the produced dependency and volume information associated with captured workload 302 (i.e., included in cooked workload 304). Once identified, core advisor 314 can compile the identified queries into a workset, which can be optimized at runtime.

In an embodiment, core advisor 314 identifies queries for the workset based on whether one or more runtime query-optimization techniques can be applied to such queries for further reducing processing latency. Core advisor 314 may identify such queries based on input from user 330 or based on a predetermined list of known queries. In an embodiment, core advisor 314 identifies queries based on the type of query. For example, it may be determined that such query optimization techniques may be applies to INSERT, DELETE, UPDATE and SELECT queries as well as cursor FETCH queries. It would be apparent to a person skilled in the art that these queries are provided as examples only and that other queries may be identified as well. A person skilled in the art would also appreciate that any one of various well-known query optimization techniques may be applies to such queries.

In an embodiment, core advisor 314 may deploy the generated workset and data grid layout (i.e., layout of data fabric 220) to data grid 200. In a different embodiment, a separate deployment tool within database system 300 may be used to deploy the workset and/or data grid layout.

In an embodiment, data grid advisor 310 and its components (workload preparer 312 and core advisor 314), or portions thereof, can be implemented in software, firmware, hardware, or a combination thereof. Embodiments of data grid advisor 310 and its components (workload preparer 312 and core advisor 314), or portions thereof, can also be implemented as computer-readable code executed on one or more computing devices capable of carrying out the functionality described herein. Examples of computing devices include, but are not limited to, a central processing unit, an application-specific integrated circuit, or other type of computing device having at least one processor and memory.

IV. METHOD

Figure 7:
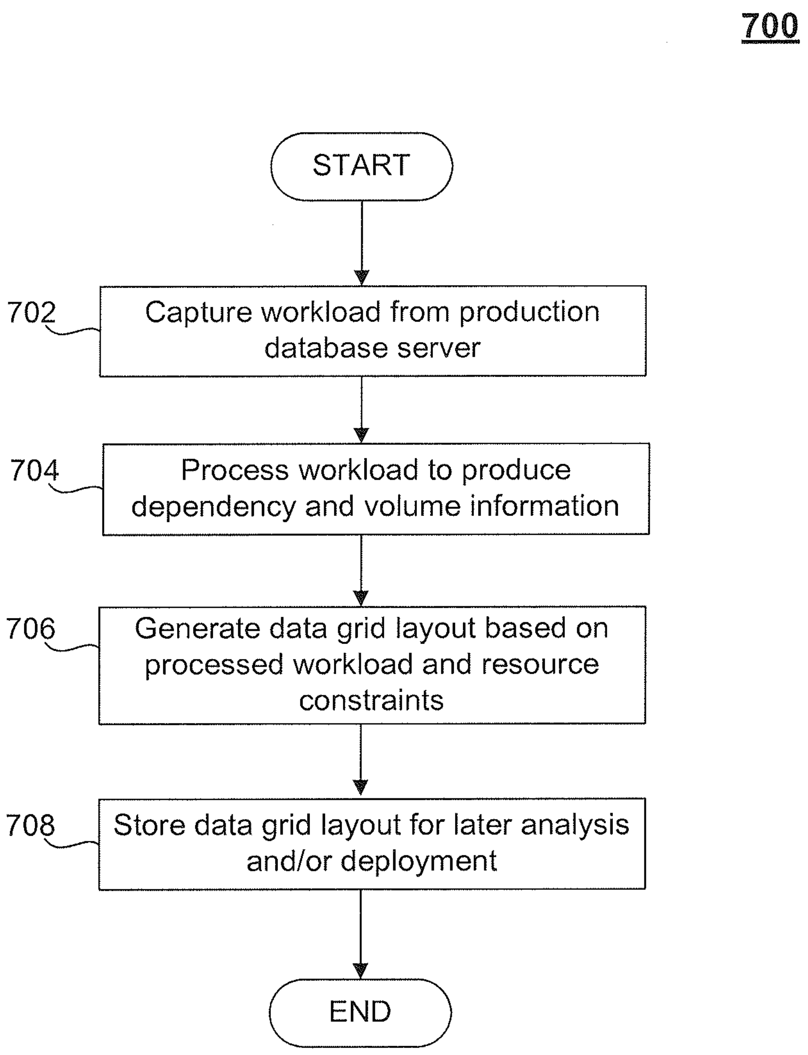
FIG. 7 is a flowchart of an exemplary method for producing an improved data grid layout in a database environment, according to an embodiment.

FIG. 7 is a flowchart of an exemplary method 700 for producing an improved data grid layout in a database environment, according to an embodiment. Method 700 includes steps 702, 704, 706, and 708. For ease of explanation, database system 200 of FIG. 2 and database system 300 of FIG. 3, as described above, will be used to describe method 700, but is not intended to be limited thereto. Method 700 begins in step 702, which includes capturing a workload from a production database server (e.g., database server 130 of FIG. 2). As described above, the workload includes the series of query requests and responses from the production database server and one or more clients of the production database server.

Method 700 proceeds to step 704, in which the captured workload is processed to produce dependency and volume information. As described above, this processing includes producing a raw workload from the captured workload and replaying the raw workload at a test or support database server (e.g., database server 320 of FIG. 3). As noted above, method 700 may include simulating the queries and responses between the production database server and the one or more clients of the production database server without the benefit of a captured and/or raw workload. Such a simulated workload is referred to herein as a "synthetic workload," as described above. Steps 702 and 704 may be performed by, for example, workload preparer 312 of FIG. 3.

Method 700 then proceeds to step 706, which includes generating a data grid layout based on the dependency and volume information associated with the cooked workload in addition to various resource constraints associated with the data grid. Such resource constraints include, but are not limited to, one or more database schemas, hardware resource limits, and the type of data granularity, as described above. Such resource constraints may be provided by, for example, a database administrator or application developer of the data grid. The generated data grid layout is a layout of one or more data fabrics within the data grid, where each data fabric has one or more cache nodes, and each cache node is an IMDB, as described above.

Method 700 concludes at step 708, in which the generated data grid layout is stored for later analysis or deployment to a production environment. For example, the stored layout may later be accessed by a database administrator for analysis and further optimization of mapping of applications and data to the data grid. It would be apparent to a person skilled in the relevant art given this description that method 700 may include additional steps, for example and without limitation, displaying the generated layout via a graphical user interface to the database administrator or application developer and/or deploying the generated layout to a production environment. Steps 706 and 708 may be performed by, for example, core advisor 314 of FIG. 3.

The use of a data grid as described herein is intended to provide improved performance and scalability through the interaction of several mechanisms. A key mechanism is a set of clustered cache nodes, linking clients to database servers in a data fabric configuration. A database administrator or application developer can use method 700 to determine the optimum mapping of data and applications onto cache nodes, based on representative workloads together with resource constraints. As described above, representative workloads may be captured from a production environment and pre-processed in a test environment.

V. EXAMPLE COMPUTER SYSTEM IMPLEMENTATION

Aspects of the present invention shown in FIGS. 1-7, or any part(s) or function(s) thereof, may be implemented using hardware, software modules, firmware, tangible computer readable media having instructions stored thereon, or a combination thereof and may be implemented in one or more computer systems or other processing systems.

Figure 8:
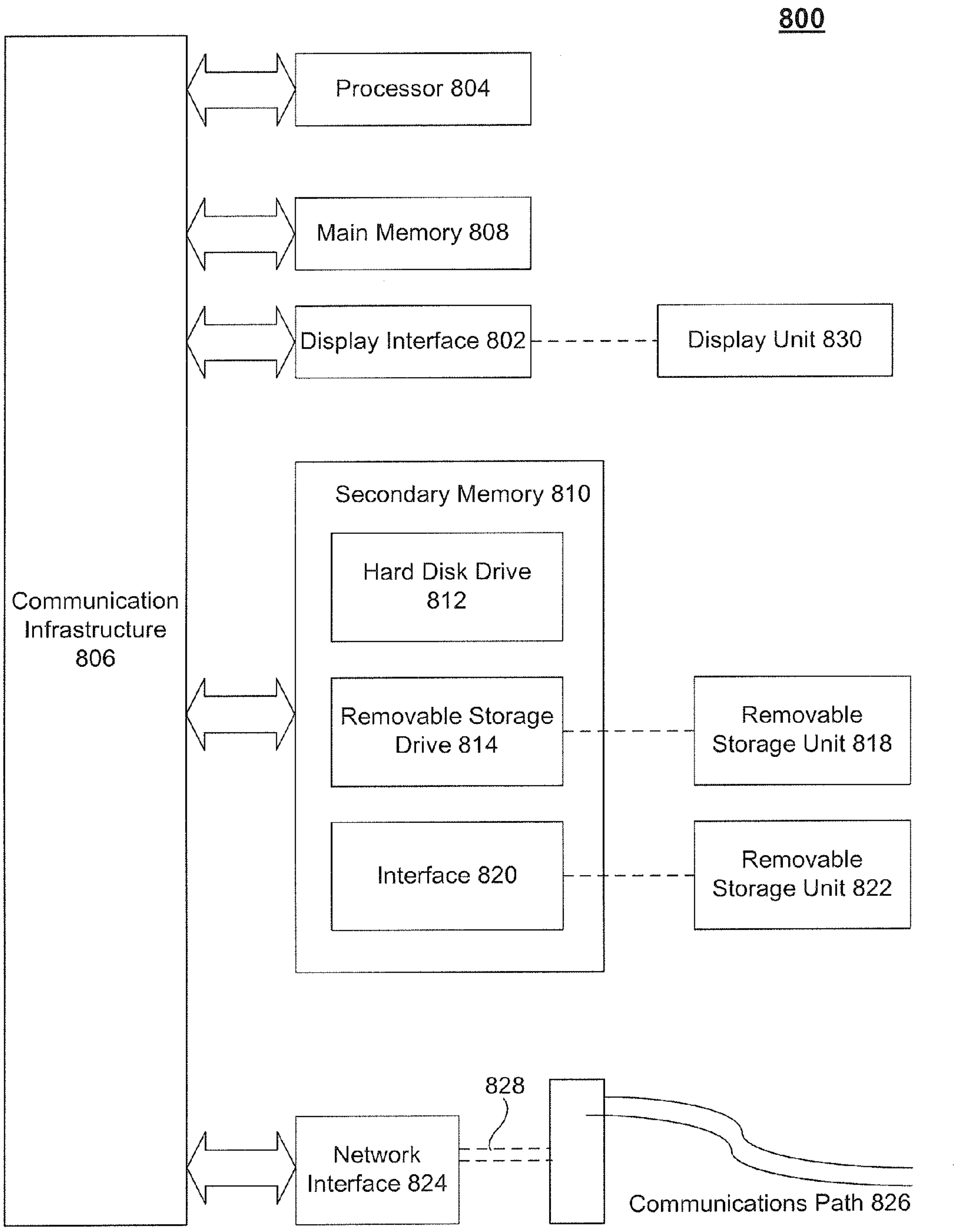
FIG. 8 is a diagram of an example computer system in which embodiments can be implemented.

FIG. 8 illustrates an example computer system 800 in which embodiments of the present invention, or portions thereof, may by implemented as computer-readable code. For example, system 200 of FIG. 2, can be implemented in computer system 800 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-7.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 800. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device. As will be appreciated by persons skilled in the relevant art, processor device 804 may also be a single processor in a multi-core/multiprocessor system, such system operating alone, or in a cluster of computing devices operating in a cluster or server farm. Processor device 804 is connected to a communication infrastructure 806, for example, a bus, message queue, network, or multi-core message-passing scheme.

Computer system 800 also includes a main memory 808, for example, random access memory (RAM), and may also include a secondary memory 810. Secondary memory 810 may include, for example, a hard disk drive 812, removable storage drive 814. Removable storage drive 814 may comprise a floppy disk drive, a magnetic tape drive, an optical disk drive, a flash memory, or the like. The removable storage drive 814 reads from and/or writes to a removable storage unit 818 in a well known manner. Removable storage unit 818 may comprise a floppy disk, magnetic tape, optical disk, etc. which is read by and written to by removable storage drive 814. As will be appreciated by persons skilled in the relevant art, removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Communications interface 824 may include a modem, a network interface (such as an Ethernet card), a communications port, a PCMCIA slot and card, or the like. Software and data transferred via communications interface 824 may be in the form of signals, which may be electronic, electromagnetic, optical, or other signals capable of being received by communications interface 824. These signals may be provided to communications interface 824 via a communications path 826. Communications path 826 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 818, removable storage unit 822, and a hard disk installed in hard disk drive 812. Computer program medium and computer usable medium may also refer to memories, such as main memory 808 and secondary memory 810, which may be memory semiconductors (e.g. DRAMs, etc.).

Computer programs (also called computer control logic) are stored in main memory 808 and/or secondary memory 810. Computer programs may also be received via communications interface 824. Such computer programs, when executed, enable computer system 800 to implement the present invention as discussed herein. In particular, the computer programs, when executed, enable processor device 804 to implement the processes of the present invention, such as the stages in the methods illustrated by flowchart 700 of FIG. 7, discussed above. Accordingly, such computer programs represent controllers of the computer system 800. Where the invention is implemented using software, the software may be stored in a computer program product and loaded into computer system 800 using removable storage drive 814, interface 820, and hard disk drive 812, or communications interface 824.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

VI. CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method to produce an improved layout of a data grid in a database environment comprising:

capturing, by a computing device, a workload from a first row-oriented database server and at least one client of the first database server, the workload comprising a set of queries and responses between the first database server and the at least one client;

producing dependency and volume information for the captured workload based on the set of queries and responses in the captured workload;

generating a layout of one or more data fabrics within the data grid in the database environment based on resource constraints associated with the data grid and the produced dependency and volume information associated with the captured workload, wherein each fabric in the one or more data fabrics comprises a plurality of cache nodes, and wherein each cache node in the plurality of cache nodes is an in-memory database server; and storing the generated layout at the computing device.

2. The method of claim 1, further comprising:

identifying a subset of queries from the set of queries in the captured workload based on the resource constraints associated with the data grid and the produced dependency and volume information associated with the captured workload, wherein one or more query-processing latency reduction techniques may be used for the subset of queries at runtime; and generating a workset for the data grid in the database environment, the workset comprising the identified subset of queries.

3. The method of claim 1, wherein the producing comprises:

replaying the set of queries and responses in the captured workload using a second database server to produce the dependency and volume information corresponding to the set of queries and responses in the captured workload, wherein the second database server is a replica of the first database server.

4. The method of claim 1, wherein the capturing comprises:

simulating, by the computing device, the queries and responses from the first database server to the at least one client based on user input and at least one database schema, wherein the producing comprises:

producing synthetic dependency and volume information corresponding to the simulated queries and responses based on the simulating, and wherein the generating comprises:

generating the layout of the one or more data fabrics within the data grid in the database environment based on the resource constraints associated with the data grid and the synthetic dependency and volume information.

5. The method of claim 1, wherein the resource constraints associated with the data grid comprise hardware resource limits, at least one database schema, and a type of data granularity.

6. The method of claim 5, wherein the type of data granularity is database granularity, and wherein an entire backend database in the database environment is copied to the one or more data fabrics in the data grid.

7. The method of claim 5, wherein the type of data granularity is partition granularity, and wherein the generating further comprises:

partitioning data from one or more tables in a backend database into data slices;

distributing the data slices within the one or more data fabrics of the data grid based on the hardware resource limits and the at least one database schema, wherein a single cache node from the one or more cache nodes is selected to have exclusive read-write ownership of the partitioned data.

8. A non-transitory computer readable storage medium having instructions stored thereon that, when executed by a computing device, cause the computing device to perform operations comprising:

capturing a workload from a first row-oriented database server and at least one client of the first database server, the workload comprising a set of queries and responses between the first database server and the at least one client;

producing dependency and volume information for the captured workload based on the set of queries and responses in the captured workload;

generating a layout of one or more data fabrics within a data grid in the database environment based on resource constraints associated with the data grid and the produced dependency and volume information associated with the captured workload, wherein each fabric in the one or more data fabrics comprises a plurality of cache nodes, and wherein each cache node in the plurality of cache nodes is an in-memory database server; and storing the generated layout at the computing device.

9. The computer readable storage medium of claim 8, the operations further comprising:

identifying a subset of queries from the set of queries in the captured workload based on the resource constraints associated with the data grid and the produced dependency and volume information associated with the captured workload, wherein one or more query-processing latency reduction techniques may be used for the subset of queries at runtime; and generating a workset for the data grid in the database environment, the workset comprising the identified subset of queries.

10. The computer readable storage medium of claim 8, wherein the producing comprises:

replaying the set of queries and responses in the captured workload using a second database server to produce the dependency and volume information corresponding to the set of queries and responses in the captured workload, wherein the second database server is a replica of the first database server.

11. The computer readable storage medium of claim 8, wherein the capturing comprises:

simulating, by the computing device, the queries and responses from the first database server to the at least one client based on user input and at least one database schema, wherein the producing comprises:

producing synthetic dependency and volume information corresponding to the simulated queries and responses based on the simulating, and wherein the generating comprises:

generating the layout of data and applications for the data grid in the database environment based on the resource constraints associated with the data grid and the synthetic dependency and volume information.

12. The computer readable storage medium of claim 8, wherein the resource constraints associated with the data grid comprise hardware resource limits, at least one database schema, and a type of data granularity.

13. The computer readable storage medium of claim 12, wherein the type of data granularity is database granularity, and wherein an entire backend database in the database environment is copied to the one or more data fabrics in the data grid.

14. The computer readable storage medium of claim 12, wherein the type of data granularity is partition granularity, and wherein the generating further comprises:

partitioning data from one or more tables in a backend database into data slices;

distributing the data slices within the one or more data fabrics of the data grid based on the hardware resource limits and the at least one database schema, wherein a single cache node from the one or more cache nodes is selected to have exclusive read-write ownership of the partitioned data.

15. A system to produce an improved layout of a data grid in a database environment comprising:

a workload preparer to capture a workload from a first row-oriented database server and at least one client of the first database server, the workload comprising a set of queries and responses between the first database server and the at least one client, and to produce dependency and volume information for the captured workload based on the set of queries and responses in the captured workload; and a core advisor to generate a layout of one or more data fabrics within the data grid in the database environment based on resource constraints associated with the data grid and the produced dependency and volume information associated with the captured workload, wherein each fabric in the one or more data fabrics comprises a plurality of cache nodes, and wherein each cache node in the plurality of cache nodes is an in-memory database server.

16. The system of claim 15, wherein the core advisor is further configured to identify a subset of queries from the set of queries in the captured workload based on the resource constraints associated with the data grid and the produced dependency and volume information associated with the captured workload, wherein one or more query-processing latency reduction techniques may be used for the subset of queries at runtime, and to generate a workset for the data grid in the database environment, the workset comprising the identified subset of queries.

17. The system of claim 15, wherein the workload preparer is configured to replay the set of queries and responses in the captured workload using a second database server to produce the dependency and volume information corresponding to the set of queries and responses in the captured workload, wherein the second database server is a replica of the first database server.

18. The system of claim 15, wherein the resource constraints associated with the data grid comprise hardware resource limits, at least one database schema, and a type of data granularity.

19. The system of claim 18, wherein the type of data granularity is database granularity, and wherein an entire backend database in the database environment is copied to the one or more data fabrics in the data grid.

20. The system of claim 18, wherein the type of data granularity is partition granularity, and wherein the core advisor is further configured to partition data from one or more tables in a backend database into data slices, and to distribute the data slices within the one or more data fabrics of the data grid based on the hardware resource limits and the at least one database schema, wherein a single cache node from the one or more cache nodes is selected to have exclusive read-write ownership of the partitioned data.

21. The method of claim 1, wherein the data grid comprises an in-memory database cache clustered on two or more database servers.

* * * * *